US012114615B2

(12) United States Patent
Johnston

(10) Patent No.: US 12,114,615 B2
(45) Date of Patent: Oct. 15, 2024

(54) ALCOHOL SOLUBLE BIODEGRADABLE COMPOSITIONS

(71) Applicant: Richard Thomas Johnston, Greer, SC (US)

(72) Inventor: Richard Thomas Johnston, Greer, SC (US)

(73) Assignee: Richard Thomas Johnston, Moore, SC (US)

( * ) Notice: Subject to any disclaimer, the term of this patent is extended or adjusted under 35 U.S.C. 154(b) by 167 days.

(21) Appl. No.: 17/561,872

(22) Filed: Dec. 24, 2021

(65) Prior Publication Data

US 2023/0200313 A1    Jun. 29, 2023

(51) Int. Cl.
  *A01G 24/22*    (2018.01)
  *A01N 25/08*    (2006.01)

(52) U.S. Cl.
  CPC ............. *A01G 24/22* (2018.02); *A01N 25/08* (2013.01)

(58) Field of Classification Search
  CPC ......... A01G 24/22; A01N 25/08; A01N 25/26
  See application file for complete search history.

(56) References Cited

U.S. PATENT DOCUMENTS

| | | | |
|---|---|---|---|
| 2,153,487 A | 4/1939 | Sharma | |
| 3,096,171 A | 7/1963 | Woerther | |
| 3,321,298 A | 5/1967 | Bidlack | |
| 3,350,329 A | 10/1967 | Scholl | |
| 3,438,797 A | 4/1969 | Biddle | |
| 3,621,612 A * | 11/1971 | Porter | A01C 1/06 47/57.6 |
| 4,212,153 A | 7/1980 | Kydonieus | |
| 4,880,455 A | 11/1989 | Blank | |
| 4,931,051 A | 6/1990 | Castello | |
| 5,219,485 A | 6/1993 | Goertz | |
| 5,538,531 A | 7/1996 | Hudson | |
| 6,238,794 B1 | 5/2001 | Beesly | |
| 6,348,217 B1 | 2/2002 | Santos | |
| 6,505,288 B1 | 1/2003 | Markush | |
| 6,682,763 B2 | 1/2004 | Kuno | |
| 6,953,593 B2 | 10/2005 | Kuhrts | |
| 7,708,822 B2 | 5/2010 | Lahav | |
| 8,545,887 B2 | 10/2013 | Soden | |
| 8,741,022 B2 | 6/2014 | Ogle | |
| 8,764,873 B2 | 7/2014 | Nevin | |
| 8,904,952 B2 | 12/2014 | Sardo | |
| 9,199,883 B2 | 12/2015 | Peacock | |
| 10,532,958 B2 | 1/2020 | Kalmbach | |
| 10,851,046 B2 | 12/2020 | Wang | |
| 10,865,156 B2 | 12/2020 | Kalmbach | |
| 10,898,477 B2 | 1/2021 | Madhavi | |
| 11,041,094 B2 | 6/2021 | Fontaine | |
| 2006/0068021 A1 | 3/2006 | Kuhrts | |
| 2010/0158974 A1 | 6/2010 | Schomig | |
| 2012/0111075 A1 | 5/2012 | Hargrove | |
| 2014/0205722 A1 | 7/2014 | Quintanar Guerrero | |
| 2015/0072857 A1 * | 3/2015 | Reichert | A01N 25/10 504/100 |
| 2019/0100471 A1 | 4/2019 | Anthony | |

FOREIGN PATENT DOCUMENTS

EP    2899178 A1 *  7/2015  ........... C05G 3/0011

OTHER PUBLICATIONS

National Center for Biotechnology Information. "PubChem Compound Summary for , Carnauba Wax" PubChem, https://pubchem.ncbi.nlm.nih.gov/compound/Carnauba-Wax. Accessed Nov. 13, 2023. (Year: 2023).*
National Center for Biotechnology Information. "PubChem Compound Summary for , Shellac" Sep. 21, 2021, PubChem, https://web.archive.org/web/20210921000925/https://pubchem.ncbi.nlm.nih.gov/compound/Shellac. (Year: 2021).*
Batori, et. al., The Effect of Glycerol, Sugar, and Maleic Anhydride on Pectin-Cellulose Thin Films Prepared from Orange Waste, Polymers, 2019, p. 392, vol. 11.
Lawrencia, et. al., Controlled Release Fertilizers: A Review on Coating Materials and Mechanism of Release, Plants 2021, 10, pp. 1-25.
Santos, et. al. Effect of the Addition of Carnauba Wax on Physicochemical Properties of Chitosan Films, Materials Research. 2017; 20 (Suppl. 2): 479-484.
Batori, Production of Pectin-Cellulose Biofilms: A New Approach for Citrus Waste Recycling, International Journal of Polymer Science, vol. 2017, pp. 1-9.
McPartland, Cannabis as repellent and pesticide, Journal of the International Hemp Association , 1997, pp. 87-92.
Landis & Dumroese, Using Polymer-coated Controlled-release Fertilizers in the Nursery and After Outplanting, Forest Nursery Notes, 2009, pp. 05-12.
Walker & Steele, Shellac, Technologic Papers of the Bureau of Standards, 1921, vol. 17, pp. 277-296.
Flis, Calcium: Improved plant health and nutrition, Crop & Soil Magazine, 2019, pp. 28-30.
Easterwood, Calcium's Role In Plant Nutrition, Fluid Jornal, 2022, pp. 1-3.
Calcium Agritpic, Incitec Pivot Limited, 2015 pp. 1-15.
Tonuk, Making Bio-Plastics An Investigation Of Material-Product Relationships, Department of Sociology, Lancaster University, Thesis, 2016.

(Continued)

*Primary Examiner* — Frederick F Krass
*Assistant Examiner* — Lucy M Tien
(74) *Attorney, Agent, or Firm* — ChemAu LLC; Blaine Childress

(57) ABSTRACT

Compositions suitable for use as biodegradable coatings, comprising mixtures of naturally sourced waxes and naturally sourced crosslinkable agents. Compositions may be used to impart water resistance to a substrate, to control the release time of soil nutrients, to reduce environmental damage, and to protect seed or crop damage from high local concentrations of salts. Compositions are preferably prepared as aliphatic alcohol and thereafter may be disposed about an agronomically important substrate core or a fibrous substrate, at temperatures below about 90° C. to impart water resistance or extend the storage time.

10 Claims, 2 Drawing Sheets

(56) References Cited

OTHER PUBLICATIONS

Masuda, Microencapsulation of Pesticides for Controlling Release from Coatings, Applied Surface Chemistry, Department of Chemical and Biological Engineering Chalmers University of Technology, Thesis, 2011.
Abraham, et. al., Preparation of Chitosan-Polyvinyl Alcohol Blends and Studies on Thermal and Mechanical Properties, Procedia Technology 24, 2015, pp. 741-748.
Guerin-Dubiard & Audic, Egg-Protein-Based Films and Coatings, Bioactive Egg Compounds, 2007, pp. 265-273.
Behin & Sadeghi, Utilization of waste lignin to prepare controlled-slow release urea, Int J Recycl Org Waste Agriculture, 2016, vol. 5, pp. 289-299.
Valdes, et. al., Natural Pectin Polysaccharides as Edible Coatings, Coatings, 2015, vol. 5, pp. 865-886.
Han, et. al., Controlled-release fertilizer encapsulated by starch/polyvinyl alcohol coating, Desalination 240, 2009, pp. 21-26.
Asrar, Development and Characterization of Shellac-Hydroxypropyl Methyl Cellulose Composite Films with Acid Catalyst, Clemson University Tiger Prints, Thesis, 2012.
Rogge, The varnished truth: The recipes and reality of tintype coatings, Department of Art Conservation, State University of New York Buffalo State College, 2013, pp. 1-7.
Gurram, et. al. A Solvent-Free Approach for Production of Films from Pectin and Fungal Biomass, Journal of Polymers and the Environment, 2018, vol. 26, pp. 4282-4292.
Yang, et. al., An Update of Moisture Barrier Coating for Drug Delivery, Pharmaceutics, vol. 11, 2019, pp. 436-453.
Haniffa, et. al., Review of Bionanocomposite Coating Films and Their Applications, Polymers, 2016, vol. 8, pp. 246-279.
Stendahl, Seed Coating for Delayed Germination—A Tool for Relay Cropping of Annual Crops, Department of Ecology and Crop Production Science, Uppsala, Thesis, 2005.

* cited by examiner

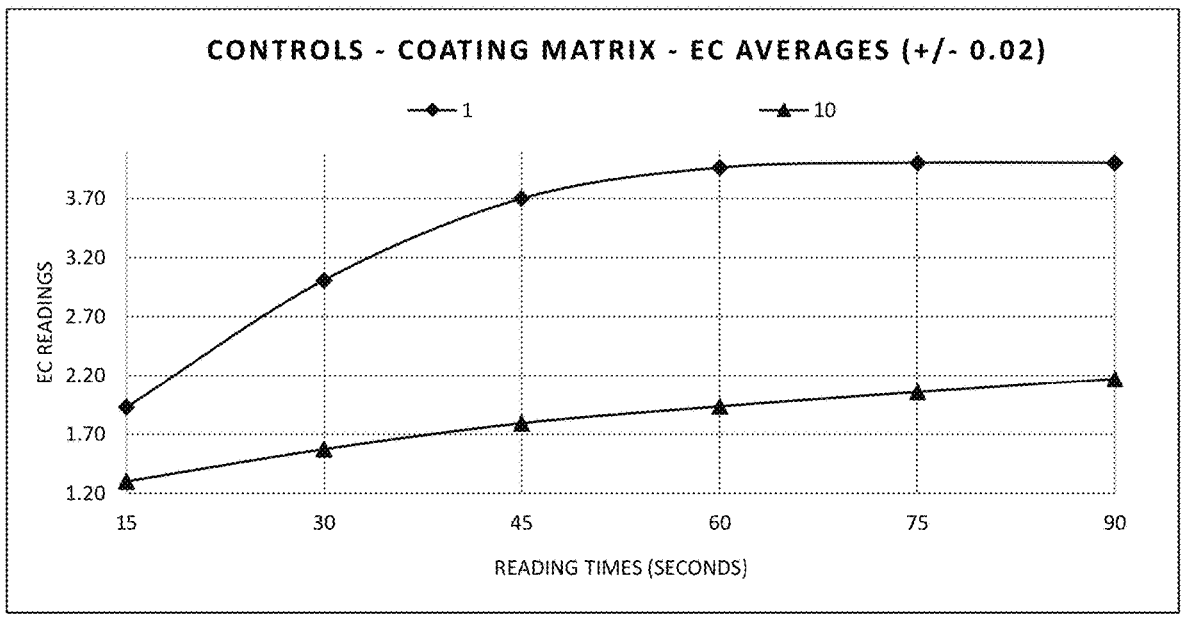
FIG. 1 Uncoated Calcium Nitrate (1)
Uncoated Calcium Nitrate Charged Hemp (10)

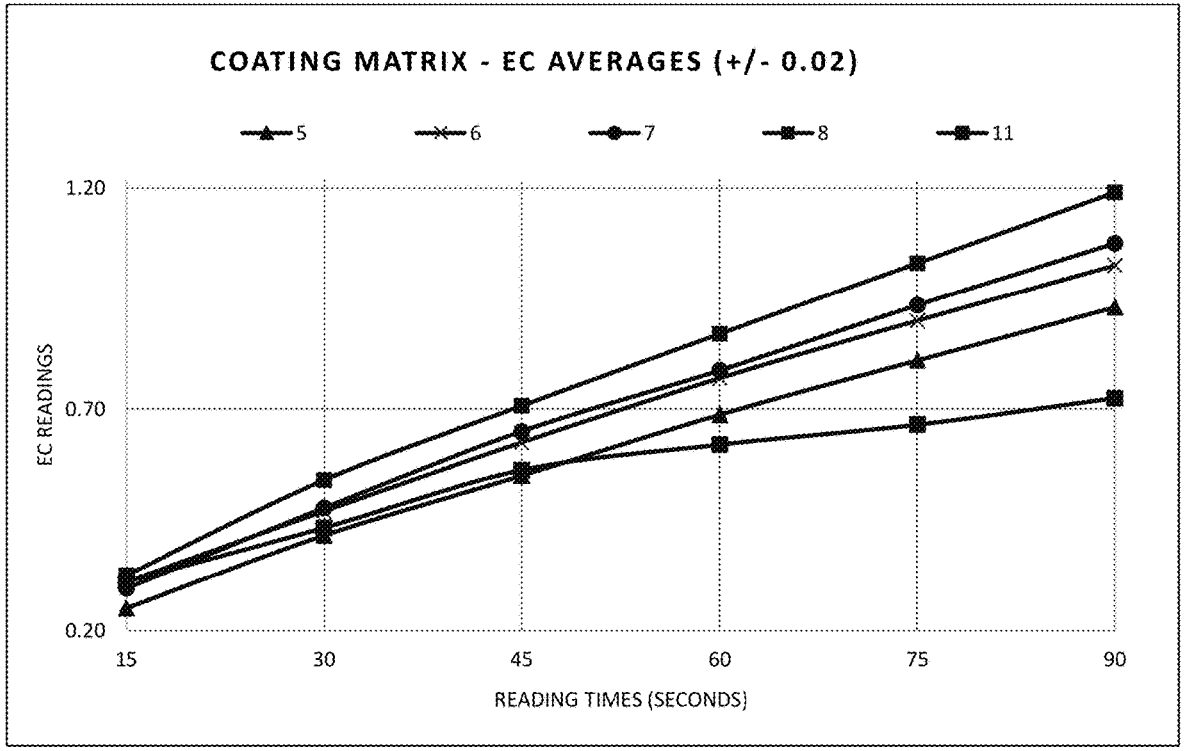
FIG. 2 Conductivity as a function of Coating Compositions in Water versus Time
Examples Graphed:
- 5 = 60% Shellac / 40% Carnauba
- 6 = 70% Shellac / 30% Carnauba
- 7 = 75% Shellac / 25% Carnauba
- 8 = 85% Shellac / 15% Carnauba
- 11 = 60% Shellac / 40% Carnauba (on calcium nitrate charged hemp)

ALCOHOL SOLUBLE BIODEGRADABLE COMPOSITIONS

CROSS-REFERENCE TO RELATED APPLICATIONS

This application claims the benefit of U.S. Provisional Patent Application No. 63/203,226, filed Jul. 13, 2021. the disclosure of which is hereby incorporated by reference in its entirety.

FIELD OF THE INVENTION

The present invention is generally directed to naturally based compositions suitable for use as a biodegradable water-resistant coating or infusion. Compositions of the invention include mixtures of a natural wax and a naturally derived crosslinkable agent. Solutions of the composition may be dissolved in a substantially anhydrous aliphatic alcohol for disposition onto agronomically important substrates or fibrous substrates.

BACKGROUND OF THE INVENTION

In-furrow and propagation fertilizers often comprise a combination of macronutrients, especially nitrogen, phosphorus, and potassium (N—P—K) with micronutrients, such as zinc, iron and sulfur. Encapsulation of fertilizer particles has been used to impart "slow release" or "controlled-release" properties to agronomic and horticultural fertilizers. Such encapsulated products have reduced "burn" to leaves or roots in cases of heavy rates of surface application, by slowing rate of dispensing core nutrient materials contained within the capsule over several days and weeks of a growing season. Particle encapsulation also reduces dust during mechanical applications of fertilizer particles, reduces labor and carbon footprint during horticultural crop production, and reduces nutrient loss via leaching and runoff.

Prior art methods of producing controlled release coatings have typically utilized petroleum-based polymeric shells, such as thermoplastic polyolefins, alkyd resins, polyisocyanate urethanes, polyacrylonitriles, thermoplastic water swelling copolymers, urea/formaldehyde reaction products and cyclopentadiene/glycerol ester copolymers. Synthetic polymer coatings have shown success slowing the release of nutrient core formulations by osmotic diffusion of a water-soluble core payload through the polymer coating wall but have not always been recognized by those having skill in the art as being biodegradable. For example, aromatic polyurethane coatings such as taught in U.S. Pat. No. 5,538,531 to Hudson et. al. have been recognized as coatings that are not biodegradable. Certain polyurethanes and many polyolefin-based synthetic coatings have thus presented an environmental disadvantage of remaining in the soil, or floating to the surface, as empty plastic shells, after having delivered their core contents.

Prior methods of coating agronomically important granules have generally included melt application of synthetic polymers, heated aqueous emulsions and suspensions, application of oil-based wax slurries, and molten waxes. However, water suspensions or heated aqueous emulsions are unsuitable as coatings for hygroscopic materials. Moreover, molten waxes and molten polymers are recognized as unfit for coating heat sensitive substrates. In the case of hygroscopic materials and heat sensitive materials such as calcium nitrate, magnesium nitrate, or ammonium nitrate granules, melt application temperatures of polyolefins and paraffins, or heated water-based emulsion formulations, rapidly degrade the particle integrity, or produce intumescence, especially when process temperature are above 100° C. Additionally, some heat sensitive materials, such as ammonium nitrate may be recognized as unsafe for high temperature coating.

While not wishing to be confined to any particular theory, it is understood by the inventor that high process temperatures associated with many prior art methods, such as heated liquid emulsions, preheated particles, molten waxes, or synthetic polymer coatings, particularly temperature above 130° C., resulted in the release of bound water in the hygroscopic particles, resulting in either fractured granules with minimal storage protection or wetted slurries that were unsuited for industrial use. In the case of calcium nitrate and ammonium nitrate, process heat may produce particle intumescence. Therefore, horticulturalists, agriculturalists, and agronomists would greatly benefit from a process for coating hygroscopic substrates and heat sensitive substrates without exposure to water and without relatively high application temperatures such as above about 130° C. Additionally, horticulturalists, agriculturalists, and agronomists would benefit from a naturally sourced and biodegradable composition. Agronomists would further benefit from environmentally responsible coating compositions, produced using plant or animal based raw materials, which could degrade into soil biomass. Growers may also benefit from a means of indicating the delivery progress of a plant nutrient by incorporating a biodegradable color indicator.

The inventor has worked diligently to address the technical and environmental shortcomings associated with prior art methods and compositions. The inventor has sought to regulate the delivery of plant nutrients by formulating novel mixtures of natural waxes and natural resins in substantially anhydrous solvents. This pursuit has presented unexpected and difficult challenges relating to ingredient compatibility, solvent selection, and composition efficacy. For example, in the case of fertilizer coatings, the ability to dissolve ingredients into one, or substantially one solvent, and to substantially encapsulate fertilizer granules from solution at temperatures below about 100° C. has been challenging. However, the inventor has developed compositions that overcome many of the limitations of the prior art while utilizing naturally sourced materials.

Definitions

As used herein, the term naturally based, naturally derived, or naturally occurring, refers to substances produced from or derived from natural origins, such as from plants, animals, or micro-organisms.

As used herein, the term biodegradable or biodegradation, refer to substances that degrade in response to environmental water, bacteria, fungi, and other microorganisms, either aerobically or with some interaction with air and light. The term biodegradable encompasses biodegradation into biomass, such as often described as composting.

As used herein, the term naturally occurring wax, or natural wax refers to waxes derived from plants and animals, comprising mixtures of naturally occurring esters of long chain carboxylic acids. Examples of natural animal waxes include spermaceti, lanolin, tallow, and beeswax. Plant based natural waxes include such waxes as, ouricury wax, palm wax, carnauba wax, candelilla wax, rice bran wax, sunflower wax, berry wax, cane wax, jojoba wax, soy wax, myrica wax, and laurel wax.

As used herein, the term palm wax refers to one or more natural waxes derived from a palm tree, such as carnauba wax, derived from the leaves of a Brazilian palm tree (*Copernica cerifera*), and ouricury wax, derived from the leaves of a Brazilian palm tree *Syagrus* coronate, and typically exhibiting a melting point of from about 80° C. to about 90° C. Carnauba wax may be obtained from suppliers such as Bell Chem, Longwood, Florida.

As used herein the term, beeswax refers to a natural wax produced by insects such as honeybees of the genus Apis. As used herein, beeswax describes a natural insect wax, typically used to build honeycomb cells, and exhibiting a melting point of about 60° C. to 85° C. Beeswax may be obtained from suppliers such as Jedwards International, Inc., Braintree, Massachusetts.

As used herein, the term shellac describes a resinous product obtained from the secretion of the female "lac bug" (*Kerria lacca*). The term generally encompasses difference colors and purities of the shellac substance. Shellac is available in various forms such as flake and button form by suppliers such from V33 Group, Remouillé, France. The term shellac includes a range of purities such as amber shellac, bleached shellac, seedlac, or kusmi shellacs. The form or color is not believed to relate to the utility of the shellac crosslinking agent chosen to carry out the invention.

As used herein, the term naturally occurring crosslinking resin or crosslinkable resin refers to natural materials obtained from plant drying oils or insect secretions such as shellac that form a high polymer by way of crosslinking molecules with covalent bonds, when exposed to light and oxygen.

As used herein, the term naturally occurring drying oil is defined as a natural oil containing unsaturated fatty acids derived from certain species of trees or plants. Drying oils useful in carrying out the invention advantageously contain a plurality of double bonds which crosslink in the presence of oxygen to produce a hard polymer. Drying oils of the invention preferably include linoleic acid and linolenic acid. Drying oils of the invention preferably exhibit iodine values of at least 80, preferably at least 100, more preferably of at least 140. Drying oils include for example, linseed oil, tung oil, hemp oil and safflower oil. Drying oils may be obtained from suppliers such as Parchem, New Rochelle, New York.

As used herein, the term hemp oil includes, but is not limited to, hemp seed oil, hemp flower extract, whole hemp plant extract, hemp root extract and combinations thereof, from the plant family Cannabaceae, including species *Cannabis sativa* and *Cannabis indica*.

As used herein, the term bast stem, and bast fiber is defined as the stem and other waste plants parts of certain dicotyledonous plants valued for fiber strength, such as for example, flax, hemp, jute, ramie, sunn, kenaf, and kudzu. Bast stem, useful in carrying out the invention, refers to both the inner woody part of the stem, also called the shive, shiv, or the hurd, as in flax shive and hemp hurd, and the exterior fibrous bark part of the stem. As used herein, hemp includes the use of waste fibrous product from *Cannabis sativa*, *Cannabis indica*, and *cannabis* hybrids.

As used herein, naturally derived colorant is defined as colorants comprised of plant extracts or minerals, such as for example, turmeric powder, red beet powder, blackberry juice powder, carrot powder, mulberry powder, red radish powder, mica powder, iron oxide, natural indigo powder, and the like.

As used herein, the term pesticide describes any substance or mixture of substances intended for preventing, destroying, or controlling any pest causing harm during the production, processing, storage, transport, or marketing of agricultural products. Pesticides may be chosen from the group consisting of one or more insecticides, fungicides, nematicides, and bactericides. Preferred pesticides include natural pesticides such as neem oil, thyme oil, chrysanthemum extract, pyrethrin cinnamon oil, geraniol, garlic extracts, and hot pepper extracts.

As used herein, agronomically important core materials includes, but is not limited to, plant nutrients, fertilizers, pH adjusting salts, seeds, pesticides, and bast stem-based substrates.

As used herein, the term granule includes fertilizer pellets, prills, powders, and chopped or ground plant waste.

As used herein, the term fertilizer includes, but is not limited to, plant nutrients, trace elements, macro-elements, micro-elements, trace metals, minerals, "essential elements", metal complexes, nutrient salts, nitrogen complexes, potassium complexes, calcium complexes and combinations of these.

OBJECTIVES OF THE INVENTION

A first objective of the invention is to provide a naturally sourced composition capable of encapsulating and extending the shelf life of highly hygroscopic core substrate materials.

A second objective of the invention is to provide a biodegradable coating including a naturally sourced composition that retards the ingress of water, environmental moisture, and soil components to preserve an agronomically important core substrate.

A third objective of the invention is to provide a color-indicating biodegradable composition capable of signaling the disposition of an agronomically important core material.

A fourth objective of the invention is to provide a naturally sourced composition that can extend and delay the release or germination of such agronomic substrate core such as a seed.

A fifth objective of the invention is to provide a naturally sourced composition that may be infused into a fibrous substrate in order to protect textiles from water infiltration.

A sixth objective of the invention is to provide a naturally sourced crosslinkable resin that will combine with a naturally sourced wax and react with ambient oxygen to provide an interpenetrating crosslink network.

A seventh objective of the invention is to provide a composition, including a naturally occurring wax, a naturally occurring crosslinkable agent, and one of more plant nutrients that may be infused into a fibrous substrate to provide a fiber based controlled-release fertilizer.

An eighth objective of the invention is to provide a naturally sourced composition capable of encapsulating and extending the shelf life of highly hygroscopic core substrate materials, using coating temperatures less than 90° C.

These objectives and other advantages of the invention are provided herein.

BRIEF DESCRIPTION OF THE DRAWINGS

FIG. 1 is a plot of uncoated calcium nitrate granules (Ex. 1) and uncoated hemp particles (Ex. 10) that were infused with calcium nitrate tested for electrical conductivity versus time.

FIG. 2 is a plot of coated calcium nitrate granules, including some of the compositions of the invention, tested electrical conductivity versus time.

SUMMARY OF THE INVENTION

In a first aspect, the present invention relates to biodegradable water-resistant compositions comprising about 15% to about 50% by weight of a naturally occurring wax and about 85% to about 55% by weight of a naturally occurring crosslinkable agent, wherein the compositions are combined in an aliphatic alcohol to form an alcoholic solution.

In a second aspect, the present invention relates to biodegradable water-resistant compositions comprising about 15% to about 45% by weight of a naturally occurring wax and about 85% to about 55% by weight of a naturally occurring crosslinkable agent, wherein said compositions are combined in an aliphatic alcohol to form an alcoholic solution, disposed onto an agronomically important substrate, and stripped of alcohol to provide a coated substrate.

In a third aspect, the invention relates to a biodegradable composition comprising about 15% to about 45% by weight of a naturally occurring wax, wherein the wax is selected from ouricury wax, carnauba wax, candelilla wax, beeswax, palm wax, rice bran wax, sunflower wax, berry wax, cane wax, jojoba wax, soy wax, myrica wax, laurel wax, and mixtures thereof; and about 85% to about 55% by weight a naturally occurring or naturally derived crosslinking agent including at least one member selected from the group consisting of shellac and a plant sourced drying oil.

In a fourth aspect the invention relates to an aliphatic alcohol solution comprising 15% to about 45% by weight carnauba wax, 85% to about 55% by weight shellac, and 0% by weight to about 10% by weight of a naturally occurring or naturally derived drying oil, said oil selected from the group consisting of linseed oil, hemp oil, walnut oil, and tung oil, and mixtures thereof.

In a fifth aspect the invention relates to a biodegradable coating prepared from an aliphatic alcohol solution comprising 15% to about 45% by weight of a naturally occurring plant wax, and optionally a second animal wax, 85% to about 55% by weight of a naturally occurring or naturally derived crosslinkable agent, and 0% by weight to about 2% by weight of natural or naturally derived colorant, said colorant suitable for indicating the integrity of a dried solid-state coating of the solution.

In a sixth aspect the invention relates to biodegradable water-resistant compositions comprising about 15% to about 45% by weight of a naturally occurring wax and about 85% to about 55% by weight of a naturally occurring crosslinking agent, wherein said compositions are combined in an aliphatic alcohol to form an alcoholic solution, and infused into an agronomically important fibrous substrate, and stripped of alcohol.

In a seventh aspect, the invention includes a method of coating a hygroscopic or heat sensitive substrate particle comprising the steps of selecting a naturally occurring wax and naturally occurring crosslinking agent, combining said naturally occurring wax and said naturally occurring crosslinking agent within a substantially anhydrous aliphatic alcohol solvent at a temperature between about 40° C. to about 90° C., to produce a heated solution, disposing the heated solution onto an agronomically important substrate; and evaporating the aliphatic alcohol solvent to provide a biodegradable water-resistant, substantially encapsulated substrate.

The biodegradable compositions of the invention may be advantageously applied as an alcoholic solution, to substantially encapsulate one or more agronomically important core materials, thereby providing upon drying, a solid-state or substantially solid-state, water-resistant coating. The use of an alcoholic solution permits the deposit of an inventive composition at temperatures between ambient temperature and the boiling point of an aliphatic alcohol. Coating temperatures are preferably between about 25° C. to about 85° C., such as about 30° C. to about 80° C., or such as about 35° C. to about 75° C.

The resulting solid-state coating advantageously retards the ingress of environmental moisture, water, bioactive soil components and controls the release of agronomically important core chemicals or seeds. When disposed about one or more agronomically important core chemicals, core granules, or core matrixes, the naturally sourced, biodegradable coatings of the invention retard the ingress of substances outside of the solid coating surface by substantially encapsulating the core substance, whilst permitting controlled diffusion of contents when desired. Such protective coatings serve to extend the shelf life or extend the release of core materials through the coating wall. Retarding water activity helps control the delivery of plant or soil nutrients, pesticides, and delays the activity of coated seeds.

As a consequence of employing natural products, the compositions of the invention are believed to be environmentally responsible compared systems such as isocyanate polymers of the prior art. The inventor has discovered a process that combines mixtures of natural waxes and natural resins, and that can deliver the mixtures as alcohol solutions, using temperatures well below that of the prior art. The selection of the alcoholic solutions of the instant process permits the compositions of the invention to be disposed upon certain heat sensitive substrates at relatively mild temperatures such as below about 100° C., or such as about 90° C., or such as about 80° C. or such as about 70° C., or such as about 60° C., or such as about 50° C., or such as about 40° C. or such as about ambient temperatures. Thus, the novel formulations of the invention can deliver biodegradable protective coatings to granules, seeds, powders, cellulosic substrates, and other surfaces, without imparting water to a substrate and without the use of the relatively high process temperatures previously associated with molten wax or man-made coatings.

The biodegradable coatings of the invention may be disposed about a desired substrate granule, or seed by passing the material through a bath of an alcohol-based solution of the compositions, such as anhydrous isopropyl alcohol, and thereafter removing the alcohol to provide a biodegradable coated substrate. It will be understood by those having skill in the art that the coating or substantial encapsulation of agronomic core materials be accomplished in steps, such as successive use of solution baths, conveyer "waterfall" coating, or spraying, with intervals of drying. Drying herein refers to evaporation of a carrier aliphatic alcohol, such as isopropyl alcohol, with or without the assistance of forced air, with or without heating, and with or without reduced atmospheric pressure. In general evaporation of the aliphatic alcohol may be accomplished with rotational agitation of coated granules with the assistance of forced air and an exhaust system.

The biodegradable coatings of the invention may be disposed about a desired core material, granule, particle, or seed by spraying an alcoholic solution of the coating composition onto the agronomically important core surfaces. Examples of important substrates include fertilizer particles, seed particles, pesticide particles, particles infused with plant nutrients, soil modifiers, bast plant stems, bast plant fiber, bast plant hurd, and mixtures thereof. Optionally, coated granules of the invention may be dusted with a mineral powder such as titanium dioxide or mica to improve particle separation or may optionally be mixed with a colorant to provide a visual indication of coating integrity.

The biodegradable coatings of the invention may be sprayed onto, or "kiss" coated onto a textile or plant fiber substrate in order to provide water resistance. If desired, multiple application steps may be employed to achieve higher levels of one or more naturally occurring compositions of the invention. As it relates to the process of coating granules, a tumbling motion during the cylinder rotation contributes to mixing and agitation as a substrate and solution are processed for alcohol evaporation. Such rotation assists in delivering a more consistent coating to each granule as well as helping to prevent substrate materials from surface bonding to one another. Those of skill in the art will recognize that drying of coated material may be assisted by either forced air, reduced pressure, mild heat, or a combination of those.

In some embodiments, the process for applying the compositions of the invention, may include more than one crosslinkable or crosslinking agent. For example, the process may include the use of shellac and a drying oil and may be carried in sequential steps or simultaneous steps. In cases in which a drying oil is employed, a crosslink accelerator may be used, such as a UV lamp, excited oxygen, or cobalt neodeconate, may be incorporated into the composition or evaporation step to assist in curing the selected drying oil.

DETAILED DESCRIPTION OF THE INVENTION

In certain embodiments, the compositions of the invention include from about 15% to about 45% by weight of one or more naturally occurring waxes. The compositions may include from about 15% to about 40% by weight of a naturally occurring wax, such as about 20% to about 35% by weight of a naturally occurring wax, or such as about 15% by weight of a naturally occurring wax, or such as about 16% by weight, or such as about 18% by weight, or such as about 20% by weight, or such as about 22% by weight, or such as about 24% by weight, or such as about 26% by weight, or such as about 28% by weight, or such as about 30% by weight, or such as about, 32% by weight, or such as about 34%, or such as about 35%, or such as about 37% by weight, or such as about 40% by weight of a naturally occurring wax.

In certain embodiments, the compositions of the invention include from about 10% to about 45% by weight of one or more natural waxes such as beeswax, palm wax, ouricury wax, or carnauba wax, combined with about 85% to about 55% of shellac, and 0% by weight to about 10% by weight of a natural drying oil. In preferred embodiments, the compositions are combined as anhydrous alcohol solutions.

In certain embodiments, the compositions of the invention include from about 55% to about 90%, by weight, of a naturally occurring crosslinking agent or resin. The compositions may include from about 57% by weight of a naturally occurring crosslinking agent or resin, such as about 59%, or such as about 60%, or such as about 62%, or such as about 65%, or such as about 66%, or such as about 68%, or such as about 70%, or such as about 72%, or such as about 74%, or such as about 76%, or such as about 78%, or such as about 80%, or such as about 82%, or such as about 84%, or such as about 85% of a naturally occurring crosslinking agent or resin. One particularly useful naturally occurring crosslinking agents is shellac resin.

In some embodiments, the compositions of the invention include an alcohol solution of a naturally occurring wax, a naturally occurring crosslinking agent, and one or more plant nutrients that are infused into a fibrous substrate to provide a fiber-based fertilizer.

EXAMPLES

The following examples illustrate some of the specific details of the present invention. Equivalent procedures and compositions within the scope of the invention will understood by those skilled in the art. The following examples examined a method of preparing coated granules of a hygroscopic fertilizer while preserving the integrity of each granule. Alcohol solutions of some possible compositions of the invention, together with comparative examples were disposed onto fertilizer granules, the alcohol was evaporated, and some of the coated and dried granules were evaluated by electrical conductivity.

Example 1

200 milliliters of laboratory grade anhydrous isopropyl alcohol supplied by Vaxxen Labs, Inc., Cortland, Ohio, was placed in a clean 250 ml heat resistant beaker and gently heated on a water bath until beginning to boil. The beaker was removed from the water bath and the isopropyl alcohol was permitted to cool until reaching a temperature of about 40° C. to about 75° C. 100 grams of calcium nitrate, obtained from Haifa North America, Altamonte Springs, Florida, was charged into a one-gallon cylinder. The charged cylinder was placed on a two-roll platform with the open end tilted at a relatively shallow angle such as about 30 degrees, then rotation was begun. 50 milliliters of the beaker contents were transferred to the charged cylinder in 10 ml to 20 ml increments until completely added. The counterclockwise rotation imparted a tumbling action so as to reduce agglomeration of particles during evaporation. A forced air fan was directed toward the open end of the rotating cylinder to advance evaporation of the isopropyl alcohol (IPA). Once visibly dry, the contents were removed from the cylinder, labelled, and transferred to a jar for subsequent testing.

Example 2

200 milliliters of laboratory grade anhydrous isopropyl alcohol from Vaxxen Labs, Inc. was placed in a 250 ml glass beaker and gently heated on a water bath until beginning to boil. The beaker was immediately removed from the water bath and four grams of Shellac Flakes from Liberon V33 Group, France, were added. The beaker was returned to the water bath and the contents were mechanically stirred until the composition was completely dissolved. The beaker was removed from the water bath and permitted to cool until reaching a temperature of about 55° C. to 75° C. 100 grams of calcium nitrate, was charged into a clean one-gallon cylinder, as described in the previous example and rotation was begun. The warmed beaker contents were sequentially transferred to the cylinder in aliquots of 5 ml to 10 ml until 50 ml of test solution was added. The forced air fan was directed toward the open end of the rotating cylinder to advance evaporation of the isopropyl alcohol (IPA). Once visibly dry, the contents were removed from the cylinder, labelled, and transferred to a jar for testing.

Examples 3-9

The general mixing and test solution addition process of Example 2 was repeated to prepare the additional compositions of Table 1. All Examples are similarly rotationally dried with the assistance of a forced air fan. In each case the solvent is isopropyl alcohol, abbreviated as IPA. Carnauba wax flakes were sourced from Better Shea Butter, Cedar Park, Texas. Beeswax was sourced from Stakich Inc., Troy, Michigan. Test compositions including controls are depicted in Table 1.

Example 10

A coffee mill was used to chop dried hemp stalk and leaves to obtain a uniform particle size, then filtered using a 5 mm sieve screen. 25 grams of the chopped dried hemp was transferred to a 100 ml. beaker. 100 grams of calcium nitrate was placed in a separate beaker containing 100 ml. of deionized water, heated gently using a hot plate with stirring, until completely dissolved. The warmed aqueous solution of calcium nitrate was immediately poured onto the chopped dried hemp. A stirring rod was used incorporate press the hemp beneath the liquid surface so as to improve uptake of calcium nitrate among all particles. The beaker of hemp particles and $CaNO_3$ solution was transferred to a fruit dehydrator to remove the water.

Example 11 (Coated Hemp)

The procedure of Example 10 was repeated to provide additional portions of dried chopped hemp, imbibed with 100 g of calcium nitrate. A sample of the charged hemp fiber was transferred to a clean one-gallon cylinder, as described in the previous examples and rotation was begun. 50 ml of the formulation of Example 5 was added in increments in order to coat the charged hemp in a similar manner as with the calcium nitrate granules. Once the IPA had evaporated, the contents were removed from the cylinder, labelled, and transferred to a jar for testing.

TABLE 1

Test Compositions

| Example | Wax grams/ (percent) | Crosslinking Agent grams/(percent) | Calcium Nitrate | IPA | Volume disposed |
|---|---|---|---|---|---|
| 1 (control) | 0.0 g./(0%) | 0.0 g./(0%) | 100 g. | 200 ml. | 0 ml. |
| 2 | 4.0 g./(100%) Carnauba | 0.0 g./(0%) | 100 g. | 200 ml. | 50 ml. |
| 3 | 3.0 g./(75%) Carnauba | 1.0 g./(25%) Shellac | 100 g. | 200 ml. | 50 ml. |
| 4 | 1.0 g./(25%) Beeswax | 3.0 g./(75%) Shellac | 100 g. | 200 ml. | 50 ml. |
| 5 | 1.6 g./(40%) Carnauba | 2.4 g./(60%) Shellac | 100 g. | 200 ml. | 50 ml. |
| 6 | 1.2 g./(30%) Carnauba | 2.8 g./(70%) Shellac | 100 g. | 200 ml. | 50 ml. |
| 7 | 1.0 g./(25%) Carnauba | 3.0 g./(75%) Shellac | 100 g. | 200 ml. | 50 ml. |
| 8 | 0.6 g./(15%) Carnauba | 3.4 g./(85%) Shellac | 100 g. | 200 ml. | 50 ml. |
| 9 | 0.0 g./(0%) Carnauba | 4.0 g./(100%) Shellac | 100 g. | 200 ml. | 50 ml. |
| 10 (control onto fiber) | 0.0 g./(0%) | 0.0 g./(0%) | 100 g. | 200 ml. | 0 ml. |
| 11 | 1.6 g./(40%) Carnauba | 2.4 g./(60%) Shellac | 100 g. | 200 ml. | 50 ml. |

Testing

To a clean 250 ml. glass beaker was added 200 ml. of cool tap water and a Teflon stirring bar. The water was taken from a series of large pitchers each kept at 23-24° C. The beaker was place on a magnetic stirrer table and speed adjusted until a mild vortex was observed. A Hanna Instruments, GroLine electrical conductivity test probe was inserted, and the meter was switched on. The meter displays a maximum reading of 4.0 milli-Siemens/centimeter (mS/cm).

Four one-gram samples of examples selected from Table 1 were carefully weighed and labelled. A stopwatch was zeroed, timing begun as the sample was simultaneous added to the beaker. Electrical conductivity readings were recorded at 15 second intervals until the 90 second mark. Table 2 reports the averages of four tests.

TABLE 2

Electrical Conductivity @ Time

Conductivity Readings (mS/Cm)

| Example | 15 Seconds | 30 Seconds | 45 Seconds | 60 Seconds | 75 Seconds | 90 Seconds |
|---|---|---|---|---|---|---|
| 1 | 1.93 | 3.0 | 3.7 | 4.0 | 4.0 | 4.0 |
| 2 | 0.85 | 1.74 | 2.43 | 3.0 | 3.34 | 3.53 |
| 3 | 1.0 | 2.0 | 2.78 | 3.1 | 3.3 | 3.47 |
| 4 | 0.5 | 0.69 | 1.0 | 1.34 | 1.58 | 1.8 |
| 5 | 0.25 | 0.42 | 0.55 | 0.69 | 0.81 | 0.93 |
| 6 | 0.3 | 0.47 | 0.63 | 0.77 | 0.9 | 1.03 |
| 7 | 0.3 | 0.49 | 0.67 | 0.81 | 0.96 | 1.1 |
| 8 | 0.3 | 0.53 | 0.69 | 0.85 | 1.01 | 1.17 |
| 9 | 0.41 | 0.78 | 1.14 | 1.55 | 1.9 | 2.22 |
| 10 | 1.30 | 1.57 | 1.79 | 1.94 | 2.06 | 2.17 |
| 11 | 0.31 | 0.43 | 0.56 | 0.62 | 0.67 | 0.73 |

While particular embodiments of the present invention have been illustrated and described, it will be recognized by those having skill in the art that various other changes and modifications can be made without departing from the spirit and scope of the invention. For example, while the inventive compositions are useful for protecting heat sensitive and hygroscopic nutrient granules such as calcium nitrate, these compositions would be also useful for many granules that are not so water or heat sensitive, such as potassium nitrate, ammonium phosphate, potassium phosphate, NPK fertilizers (such as 8-6-6), naturally based pesticides, and the like. Furthermore, the inventive compositions may be applied to additional natural substrates such as dried seaweed, or hemp shiv imbibed with plant nutrients. It is therefore intended to cover all such changes and modifications that are within the scope of this invention within the appended claims.

We claim:

1. An aliphatic alcohol solution comprising:
   about 15% by weight to about 40% by weight of a naturally occurring wax, said wax being selected from at least one member of the group consisting of palm wax, ouricury wax, carnauba wax, jojoba wax, rice bran wax, sunflower wax, berry wax, myrica wax, beeswax, and laurel wax; and
   about 60% by weight to about 85% by weight of a naturally occurring crosslinking agent, the naturally occurring crosslinking agent comprising: shellac and 0% to about 5% by weight of a naturally occurring drying oil;
   wherein said aliphatic alcohol solution provides a water-resistant substrate when disposed thereon.

2. The aliphatic alcohol solution according to claim 1, wherein the naturally occurring drying oil is selected from the group consisting of linseed oil, hemp oil, safflower oil, tung oil, and mixtures thereof.

3. The aliphatic alcohol solution according to claim 1, wherein said substrate comprises a granule of fertilizer.

4. The aliphatic alcohol solution according to claim 1, wherein said substrate comprises a seed.

5. The aliphatic alcohol solution according to claim 1, wherein said substrate comprises a pesticide.

6. The aliphatic alcohol solution according to claim 4, wherein the aliphatic alcohol solution encapsulates the seed, and wherein the encapsulation postpones germination of the seed.

7. A coating prepared from the aliphatic alcohol solution of claim 1, wherein the aliphatic alcohol solution is disposed upon a substrate, and wherein the alcohol is removed to provide a water-resistant coated substrate.

8. A process for preparing the aliphatic alcohol solution of claim 1, comprising the steps of:
   a) selecting a naturally occurring wax and naturally occurring crosslinking agent;
   b) combining said naturally occurring wax and said naturally occurring crosslinking agent within a substantially anhydrous aliphatic alcohol to provide an alcoholic mixture; and
   c) heating the alcoholic mixture at a temperature between about 40° C. to about 90° C., to provide a heated solution.

9. The process according to claim 8, wherein the anhydrous aliphatic alcohol comprises isopropyl alcohol.

10. The process according to claim 8, further comprising the steps of:
    d) cooling the heated solution of step (c);
    e) disposing the cooled solution of step (d) onto a substrate; and
    f) evaporating the substantially anhydrous aliphatic alcohol to provide a water-resistant, encapsulated substrate.

* * * * *